July 12, 1966   R. A. KAMINSKAS   3,260,108
SYSTEM FOR REPRESENTING ANGLE OF ATTACK AND THE LIKE
Filed May 6, 1963
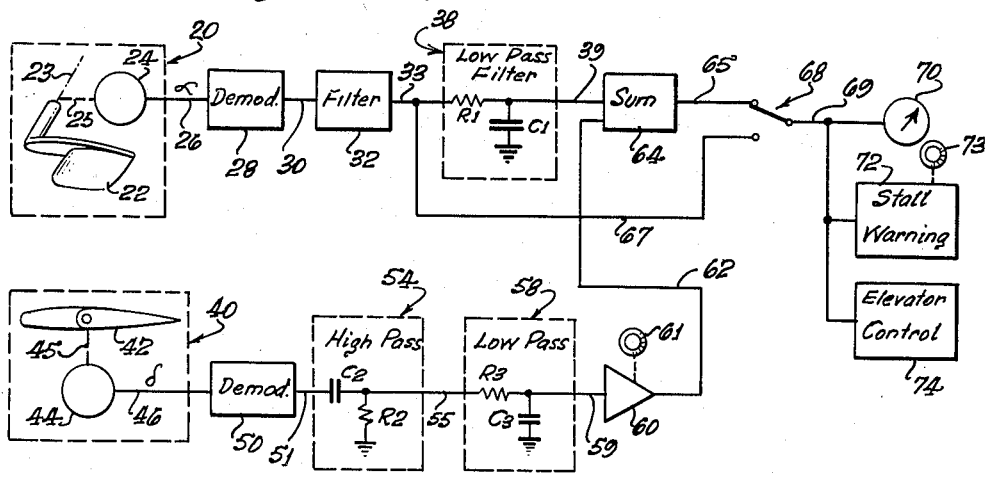
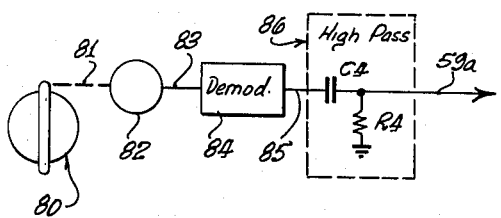
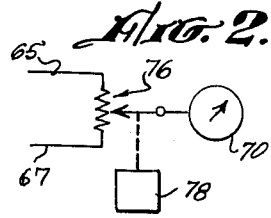
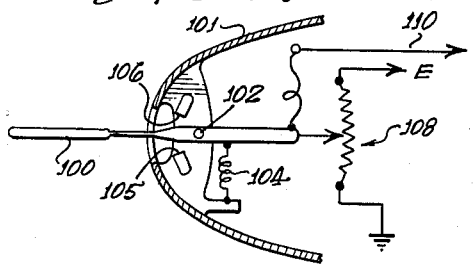
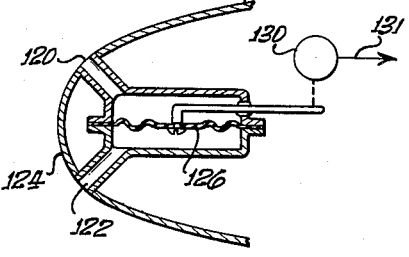
Rimvydas A. Kaminskas,
INVENTOR.
By Batchelor + Lewis

United States Patent Office 3,260,108
Patented July 12, 1966

3,260,108
SYSTEM FOR REPRESENTING ANGLE OF
ATTACK AND THE LIKE
Rimvydas A. Kaminskas, Duarte, Calif., assignor to Giannini Controls Corporation, Los Angeles, Calif., a corporation of New York
Filed May 6, 1963, Ser. No. 278,197
7 Claims. (Cl. 73—178)

This invention relates to the development of a signal representing an aircraft flight variable that depends upon the angle of attack of the aircraft. That variable may, for example, be the angle of attack itself, normally measured by a vane mounted on a mast, on a wing strut or on a lateral surface of the fuselage; or it may be a more complex flight variable that is a joint function of angle of attack and another quantity, such as indicated air speed, for example. An illustration of such relatively complex variables is the quantity referred to as lift ratio in Patent No. 2,945,375 issued July 19, 1960 to L. M. Greene. That latter variable may be measured pneumatically by means of spaced orifices near the leading edge of a wing; or by a spring-biased and generally horizontal vane extending forward from a selected point of the leading edge of the wing. For clarity of description, the invention will be described with particular reference to the angle of attack, it being understood that the invention relates to any variable that depends significantly upon angle of attack.

A serious difficulty in sensing all such quantities that depend significantly upon angle of attack is the wide frequency range of the irregular signal variations that occur, especially in gusty weather. Such aerodynamic fluctuations are inconvenient when the signal is monitored visually and may cause spurious response when the signal is supplied to a control system. It is possible to damp out such fluctuations, for example by mechanical filter devices incorporated in the vane mechanism or by electrical filtering of the signal produced by the vane-driven transducer. However, the relatively low frequency components of the fluctuations cannot be removed by conventional filtering without a corresponding sacrifice of speed of response of the damped signal to variations in angle of attack that result from changes in aircraft orientation. The resulting sluggishness of response is nearly always objectionable, and is sometimes intolerable, for example when the angle of attack signal is to be used for flight control during takeoff or approach, or is employed to develop a warning signal when the value of the variable indicates possibility of a stall.

In brief, the problem of sensing angle of attack results in large part from the fact that the frequency spectrum of the aerodynamic noise overlaps the frequency range of the desired signal response.

A primary object of the present invention is to obtain an output signal that includes frequency components in that region of overlap, representing variations of angle of attack due to changes of aircraft orientation and yet being substantially free of spurious variations due to noise.

A further object of the invention is to provide such a signal for angle of attack or the like wherein the steady state value is derived directly from a primary sensor and is therefore free of electronic drift.

The invention further permits rapid and convenient modification of the system to accommodate variations in gustiness of the weather. With such adjustment, it is possible in relatively smooth air to derive the signal substantially directly from the primary sensor during transients as well as under steady state conditions; and to modify the system so as to avoid excessive fluctuations when the air becomes relatively rough.

In accordance with one aspect of the invention, the angle of attack signal is derived partly from a local primary angle of attack sensor, which may be conventional type; and partly from an auxiliary input variable that is directly related to variations in pitch attitude of the aircraft as a whole. The primary angle of attack sensor provides the steady state component of the output signal and also the relatively low frequency components which do not overlap significantly with the aerodynamic noise spectrum. The auxiliary input variable is utilized to provide the required relatively high frequency components of the output signal, typically within the frequency range of the aerodynamic noise.

In accordance with a further aspect of the invention, the signal component derived from the auxiliary variable is obtained from the pitch angle of the aircraft, suitably filtered to eliminate low frequency components of the pitch angle variation. Such an auxiliary signal component may be derived in many different ways, depending upon the instrumentation that is available. For example, the output from a pitch gyro may be shaped by a high-pass filter with suitable time constant, to be more fully defined, to produce the auxiliary signal component.

In accordance with a further aspect of the invention, the auxiliary signal component may be derived from the position of the elevator of the aircraft. Dynamically, the elevator position may be considered to represent the rate of change of the pitch angle, so that pitch angle is obtainable by integrating elevator position.

A further aspect of the invention limits the frequency range of the signal component derived from the auxiliary variable to a range that is effectively complementary to the frequency range of the filtered angle of attack signal. The signal from the primary angle of attack sensor is preferably filtered by a low pass filter with a cutoff frequency that is low enough to substantially eliminate the objectionable aerodynamic fluctuations; and the auxiliary signal component is derived in such a way that it is independent of the steady state value of the auxiliary variable and is also preferably non-responsive to frequency components of the variations of the auxiliary variable lower than that cutoff limit. If the auxiliary variable initially contains frequency components higher than required for the final composite angle of attack signal, those components are preferably removed, as by suitable filtering.

With that complementary relationship between the frequency ranges of the two signal components, adjustment for varying air conditions may typically involve coordinated variation of both the frequency cutoff of the primary angle of attack signal and the low frequency limit of response of the auxiliary signal component. Alternatively, it is desirable under some conditions simply to make the output signal independent of the auxiliary variable, utilizing for the time being the output of the primary sensor in conventional manner.

A full understanding of the invention, and of its further objects and advantages, will be had from the following description of certain illustrative manners in which it may be carried out. The particulars of that description, and of the accompanying drawings which form a part of it, are intended only as illustration of the invention, and not as a limitation upon its scope, which is defined in the appended claims.

In the drawings:

FIG. 1 is a schematic diagram representing an illustrative embodiment of the invention;

FIG. 2 is a fragmentary schematic diagram corresponding to a portion of FIG. 1 and representing a modification;

FIG. 3 is a fragmentary schematic diagram corresponding to a portion of FIG. 1 and representing a modification;

FIG. 4 is a schematic diagram representing a further modification; and

FIG. 5 is a schematic diagram representing another modification.

In the illustrative embodiment of the invention represented in FIG. 1, an angle of attack sensor is indicated at 20. Sensor 20, which may be conventional, typically comprises a balanced vane 22, pivotally mounted on a horizontal axis 23 and adapted to be deflected about that axis by the air stream. Vane 22 is coupled to a transducer 24 via a mechanical linkage represented at 25. Transducer 24 may comprise any suitable type of linear or angular transducer, such, for example, as a potentiometer, differential transformer or selsyn transmitter. It produces on the line 26 an electrical signal corresponding to the position angle of vane 22 about axis 23. The average value of that signal represents the angle of attack of the aircraft.

However, especially in rough air, the position of vane 22 is subject to rapid and erratic variations, commonly referred to as noise. Those variations typically include frequency components of troublesome amplitude over a broad frequency range extending from a lower limiting frequency, which will be denoted $f_1$ for convenience of reference, up to frequencies well above the range of interest for the present purpose. Especially in the upper portion of that frequency range, those large amplitude fluctuations in vane angle are due predominantly to irregularities in the direction of the airstream which are of such small scale and duration that they do not represent changes of significant duration in the true angle of attack for the aircraft as a whole. Significant changes in overall angle of attack may also result from air movement, as when the aircraft encounters a relatively large air mass having a vertical velocity component. The resulting fluctuations in vane angle include frequency components in the region below $f_1$ where the average noise amplitude is relatively small.

In practice, the effective lower frequency limit of the large amplitude noise depends somewhat upon the nature and construction of primary sensor 20, and varies considerably with the condition of the atmosphere. However, for purposes of description $f_1$ may be considered to have a definite value, typically corresponding to the lowest frequency at which the indicated value of angle of attack for the vane structure in use may be obscured by noise under conditions likely to be encountered in actual practice. The value of $f_1$ may be taken for illustration as approximately 0.025 cycle per second.

A large part of that noise content of the initial angle of attack signal can be eliminated in conventional manner by suitable filtering of the signal. If the signal from transducer 24 is a modulated carrier frequency, for example, it is typically demodulated at 28 to produce on the line 30 a direct current voltage signal. That signal is then shaped, as by a low pass RC filter network represented schematically at 32, to remove the high frequency components that are produced substantially wholly by local irregularities in the air stream around vane 22. Part or all of that conventional filtering may be accomplished, if desired, in known manner by mechanical filtering mechanism inserted ahead of transducer 24, typically as a part of linkage 25. Mechanical filtering mechanism of a type suitable for that purpose is illustratively described in United States Patent No. 2,839,922.

The cutoff frequency for filter 32 or its equivalent is ordinarily selected sufficiently high that the resulting signal on the line 33 includes the full range of frequency components desired in a final angle of attack signal. That range typically extends from zero frequency to a selected value $f_2$ that depends upon the aircraft under consideration. The required maximum frequency response $f_2$ is related to the response time of the aircraft to a change in pitch command. For a relatively heavy aircraft such as a commercial jet transport, for example, for which the aircraft dynamics prevent rapid changes in the pitch angle, proper "feel" of the instruments or controls may be obtainable with the cutoff value as low as about 0.25 c.p.s. On the other hand, for a light plane it may be desirable to make $f_2$ as high as about 1 c.p.s., in order to insure that the resulting signal will correctly reflect the most rapid changes in the true angle of attack that are of significance for the purpose at hand.

The upper limit $f_2$ of the frequency range that is required to be included in the final angle of attack signal is ordinarily appreciably higher than the lower limit $f_1$ of the noise content of the initial signal. That overlap is typically a decade or more. Whenever there is such an overlap, it is not feasible to eliminate noise satisfactorily merely by a low-pass filter or its equivalent. For if the cutoff limit of the filter is adjusted to attenuate frequency components of the noise between $f_1$ and $f_2$, the desired frequency components of the signal itself in that same range are correspondingly attenuated. The final signal will necessarily either include undesired noise or lack desired frequency range.

The present invention meets that difficulty. The initial angle of attack signal is severely filtered to lower the noise content to an acceptable extent; and the desired frequency range of the final signal is then restored by insertion of an auxiliary signal developed especially for that purpose. That auxiliary signal is developed in such a manner that it is essentially free of aerodynamic noise. That is accomplished by deriving the auxiliary signal independently of angle of attack sensor 22.

As shown illustratively in FIG. 1, the conventional angle of attack signal on line 33 is further filtered, as by the low pass filter network represented schematically at 38, to substantially removed frequency components above a selected value $f_3$. That cutoff value corresponds generally to $f_1$, the lower limit of the frequency range in which noise is troublesome. However, $f_3$ typically varies appreciably with the type of aircraft and the detailed use for which the final output signal is intended. As illustration, $f_3$ is typically approximately 0.025 c.p.s. for a large aircraft and approximately 0.1 c.p.s. for a light plane. The resulting signal on the line 39 then contains information on the steady state and low frequency components of angle of attack, typically below $f_1$.

Such shaping of the signal from line 33 may conveniently be described in terms of the transfer function for the device 38, which is typically of the form $$\frac{1}{t_3 s + 1} \quad (1)$$

where $s$ represents the Laplace operator and the time constant $t_3$ corresponds to the selected cutoff frequency $f_3$. Thus the shaping may be accomplished by a device of any desired type having a transfer function of the form (1). A low pass filter circuit of the type shown at 38, comprising a series resistance R1 and a shunting capacitance C1, is illustrative.

For many purposes the filtering devices represented at 32 and 38 can be integrated into a single device. However, as will appear more fully, it is often useful to have available the angle of attack signal with the relatively mild degree of filtering existing at line 33, as well as with the more severe filtering that obtains at line 39. In fact, the two filter devices 32 and 38 may, if desired, be replaced by a larger number of devices connected in series and having progressively lower cutoff frequencies, thereby making available any desired number of intermediate signals with corresponding degrees of filtering.

In the present embodiment, the auxiliary signal is derived from the output of a sensor indicated at 40 which is responsive to the position of the elevator control surface 42 of the aircraft. That sensor may comprise a transducer 44 of any suitable type mechanically linked via 45 to the elevator itself or to any point of the control mechanism for the elevator. Transducer 44 typically produces on the line 46 a modulated carrier signal which is then demodulated at 50, typically in conventional manner. The resulting direct current signal on the line 51 directly represents the elevator angle δ.

That δ signal is shaped, as by a suitable RC filter network, to remove frequency components outside of the range of interest, that is typically outside of the range between $f_3$ and $f_4$, where $f_3$ is essentially the cutoff frequency of filter 38, and $f_4$ is the desired high-frequency limit of the final composite angle of attack signal, typically equal to $f_2$, discussed above. That filter network, as illustratively shown, comprises two distinct networks. One network, indicated at 54, is of high-pass or differentiating type with cutoff corresponding to $f_3$, and typically comprises the series capacitance C2 and the shunt resistance R2; and the other network, indicated at 58, is a low-pass or integrating type with cutoff frequency corresponding to $f_4$, and typically comprises the series resistance R3 and the shunt capacitance C3. Alternatively, those two types of filtering action may be performed in known manner by a unitary RC network of suitable type, or indeed, by any means having the appropriate transfer function.

The overall transfer function for the devices 54 and 58 is typically of the form $$\frac{t_3 s}{(t_3 s+1)(t_4 s+1)} \qquad (2)$$

where $s$ has the same meaning as in (1), and $t_3$ and $t_4$ represent time constants corresponding to the frequencies $f_3$ and $f_4$, respectively. The devices 54 and 58, whether physically integrated or not, may be of any type having a transfer function of the form (2).

The elevator position angle δ represents a measure of the pitch rate and hence of an important component of the rate of change of the angle of attack. Since the action of low pass filter 58 is essentially equivalent to integration of the signal, the resulting signal on line 59 represents to a good approximation the variation in angle of attack that is due to changes in aircraft pitch angle within the frequency range between $f_3$ and $f_4$.

That signal on line 59 is typically amplified, as by the amplifier 60 which preferably has variable gain, adjustable by the control indicated at 61. The resulting auxiliary signal on the line 62 is summed with the shaped primary angle of attack signal on line 39, already described. That summation is performed by the device 64, which may be of any suitable type. The polarities of the two signals are taken so that signal magnitudes are additive when both correspond to positive angle of attack. The resulting signal on the line 65 may then be supplied as a composite angle of attack signal to any desired utilization device.

One such utilization device is represented illustratively as a visual meter or indicator 70 from which the pilot may obtain information as to the existing angle of attack to guide him, for example in controlling the speed or pitch angle of the aircraft. Another utilization device is indicated at 72, comprising a warning signal arranged to be energized in response to a value of the angle of attack signal exceeding some predetermined value, manually settable at 73, in order to warn the pilot that a stall is imminent. A third illustrative device for utilizing an angle of attack signal is the automatic elevator control mechanism indicated schematically at 74. Stall warning device 72 and elevator control 74 may be of known construction, and do not require detailed description. Many other uses are well known for a signal that represents the angle of attack of the aircraft, including speed control devices, ventural contact warning devices, fire control devices in military craft, and the like. The composite angle of attack signal produced by the present invention may be supplied simultaneously or selectively to several such devices, or to only one, as desired.

In accordance with a further aspect of the invention, an angle of attack signal of conventional type may be tapped from the output of sensor 20 and supplied selectively to the utilization device in place of the composite signal already described. For example, the signal on line 33 may be supplied via the line 67 to a switching device 68, shown as a double-throw switch. In upper position of switch 68, as shown, the composite signal from summing device 64 is supplied via the line 69 to indicator 70. In lower switch position, auxiliary sensor 40 is not utilized, and the conventional angle of attack signal from filter 32 is supplied to the indicator. Switch 68 may be operated manually by the pilot in accordance with the condition of the atmosphere; or may be operated automatically under any desired type of control.

The switch 68 is intended to represent switching means of any desired type for selecting an appropriate one from among a variety of available signals or signal combinations. Those available signals typically include any desired number of primary angle of attack signals which have been filtered to selected degrees, as at 33 and 39 in FIG. 1, and any desired number of sums of particular filtered primary signals and correspondingly filtered auxiliary signals, of which the sum on line 65 is illustrative. Switching means of known type may be employed for selecting any desired signal or combination of signals. In particular, the two-position switch 68 of FIG. 1 may be replaced if desired by suitable means for providing a gradual transition from one signal or signal combination to another. For example, a potentiometer 76 may be connected between the lines 65 and 67, as shown illustratively in FIG. 2, and its wiper connected to the output device 70. The wiper may be driven manually or by any desired mechanism, indicated schematically at 78. The potentiometer output is then a linear combination of the two input signals on lines 65 and 67, respectively, and the coefficients of those signals in the linear combination vary continuously as the wiper is moved.

FIG. 3 represents in fragmentary form a modification of the system of FIG. 1, wherein the auxiliary signal is derived from a variable other than the elevator position δ. In FIG. 3 a pitch gyroscope is represented schematically at 80, with conventional pickoff comprising a transducer 82 coupled via 81 to the gyro pitch movement. The signal produced on the line 83 then represents the existing pitch angle θ of the aircraft relative to a zero value which may be arbitrarily selected. If the signal on line 83 is of alternating current type, it is demodulated, as by conventional means indicated at 84. The resulting signal on line 85 is shaped by a high pass filter with a suitable frequency cutoff $f_5$. The preferred cutoff value varies somewhat with the characteristics of the aircraft, being typically of the same order of magnitude as $f_1$, described above. The transfer function corresponding to such shaping is typically of the form $$\frac{t_5 s}{t_5 s+1} \qquad (3)$$

where $t_5$ is a time constant corresponding to $f_5$. The signal on line 85 can be shaped by any device having a transfer function of that form. An illustrative RC filter network for that purpose comprises the series capacitance C4 and the shunt resistance R4 represented schematically at 86 in FIG. 3. The resulting signal on the line 59a is then essentially equivalent to the signal on line 59 of FIG. 1, already described, and may be employed in place of the latter signal in a system otherwise similar to FIG. 1.

As already indicated, the principles of the present invention are applicable to the development of signals representing flight variables other than the angle of attack. In particular, more complex quantities which depend upon angle of attack and also upon other flight variables such as indicated air speed, for example, are ordinarily sensed by devices that are subject to noise having a frequency spectrum that overlaps the desired frequency range of the final signal. The primary signal from such sensors can be severely filtered in a manner analogous to that described above in connection with FIG. 1. An auxiliary signal representing angle of attack within the general frequency range $f_1$ to $f_2$ can be developed as already described, and summed with the filtered primary signal. It is usually immaterial that the auxiliary signal corresponds to a component of angle of attack alone and is independent of the indicated airspeed or other flight variable upon which the primary signal and the function it represents may depend. Since such flight variables as indicated airspeed change relatively slowly, their contribution to the function is satisfactorily represented by the frequency components lower than $f_1$, which are included in the primary signal.

FIG. 4 represents an illustrative sensor for a quantity of the described type, which is essentially the dynamic pressure in a vertical direction at a fixed point adjacent the nose portion of a wing. That quantity varies with the position on the wing of the stagnation point, which depends upon the angle of attack; and also varies with the indicated airspeed. The sensor shown comprises a vane 100, which lies essentially in a horizontal plane and is seen edge-on in the figure. Vane 100 projects forward through the nose portion of a wing 101. It is pivoted on a horizontal axis at 102 and is urged in one direction about that axis by the spring 104. Limit stops are indicated at 105 and 106. In still air, or when the stagnation point is close to vane 100, spring 104 deflects the vane against one of the stops. As the stagnation point moves away from the vane, due to variation in angle of attack, an increasing force opposes the spring, causing vane deflection away from its zero position.

That deflection is detected by a transducer of any suitable type, shown illustratively as the potentiometer 108 with output on the line 110. The vane deflection may be made to either increase or decrease with increasing angle of attack, according to the direction of spring 104 and the position of the vane above or below the stagnation point under flight conditions. In each case the deflection also increases with indicated airspeed.

FIG. 5 illustrates schematically another form of sensing mechanism responsive to a function of both angle of attack and indicated airspeed. The nose portion of an airplane wing 101 is provided with two orifices 120 and 122 which are mutually spaced vertically. Conduits from the respective orifices supply pressures to opposite sides of the differential pressure responsive diaphragm 126, which is linked in any convenient manner to a transducer 130. When the orifices are suitably positioned, typically on opposite sides of the region of variation of the stagnation point 124, the output signal on line 131 depends jointly upon the location of the stagnation point and the indicated airspeed. The functional response is essentially similar to that of the sensor of FIG. 4.

The sensor of FIG. 4 or FIG. 5 may be substituted for angle of attack sensor 20 in FIG. 1. Line 110 of FIG. 4 or line 131 of FIG. 5 then supplies a signal to demodulator 28 of FIG. 1, or, if the signal is already of direct current form, directly to filter 32. The rest of the system of FIG. 1 may then operate essentially as has already been described. If the system is to be used over a large range of indicated airspeed, it may be desirable to vary the ratio of the two signal components that are combined at adder 64, as by manual or automatic control of knob 61, to increase the gain of amplifier 60 as the indicated airspeed increases. However, it is found in practice that the gain can be held constant over a wide range of variation of indicated airspeed with little or no detectable adverse effect. And when the auxiliary signal is derived from pitch angle, as in the modification shown in FIG. 3, rather than from elevator angle, the relative amplitute of the primary and auxiliary signals typically remains constant throughout the entire speed range.

I claim:

1. A system for developing a signal representing a flight variable that is a function of angle of attack of an aircraft, said system comprising in combination
sensing means responsive to said flight variable and acting to develop a primary signal representing the value thereof,
low pass filter means for removing from said signal frequency components above a critical frequency,
means for producing an auxiliary signal representing variations in the pitch angle of the aircraft and including frequency components above said critical frequency,
means for summing the auxiliary signal and the filtered primary signal to produce a composite signal that substantially represents the flight variable and includes frequency components on both sides of the critical frequency.

2. A system as defined in claim 1, and wherein said flight variable is the angle of attack of the aircraft.

3. A system as defined in claim 1 and wherein said flight variable is a function of both the angle of attack and the indicated airspeed of the aircraft.

4. A system as defined in claim 1, and including also output means and means for supplying selectively to the output means either the composite signal or the primary signal.

5. A system as defined in claim 1, and including also output means, means for supplying to the output means a signal that is a linear combination of the composite signal and the primary signal, and means for continuously varying the coefficients of said linear combination.

6. A system for developing a signal representing a flight variable that is a function of angle of attack of an aircraft, said system comprising in combination
sensing means responsive to said flight variable and acting to develop a primary signal representing the value thereof,
low pass filter means for removing from said signal frequency components above a critical frequency,
means for producing an auxiliary signal representing variations in the position of the elevator control surface of the aircraft,
means for effectively integrating the auxiliary signal,
means for summing the integrated auxiliary signal and the filtered primary signal to produce a composite signal that substantially represents the flight variable and includes frequency components on both sides of the critical frequency.

7. A system for developing a signal representing a flight variable that is a function of angle of attack of an aircraft, said system comprising in combination
sensing means responsive to said flight variable and acting to develop a primary signal representing the value thereof,
means for producing an auxiliary signal representing variations in the pitch angle of the aircraft,
low pass filter means for removing from said primary signal frequency components above a critical frequency,
high pass filter means for removing from said auxiliary signal frequency components below said critical frequency,
means for summing the filtered auxiliary signal and the filtered primary signal to produce a composite signal that substantially represents the flight variable and includes frequency components of the flight variable above the critical frequency due to changes of attitude of the aircraft and includes frequency components of the flight variable below the critical frequency due to changes of attitude of the aircraft and to changes of the vertical velocity component of the surrounding atmosphere.

No references cited.

LOUIS R. PRINCE, *Primary Examiner.*